United States Patent [19]

Wirth

[11] 4,281,745

[45] Aug. 4, 1981

[54] BRAKE DISK FOR DISK BRAKES ON A RAIL VEHICLE

[75] Inventor: Xaver Wirth, Ismaning, Fed. Rep. of Germany

[73] Assignee: Knorr-Bremse GmbH, Munich, Fed. Rep. of Germany

[21] Appl. No.: 27,883

[22] Filed: Apr. 6, 1979

[30] Foreign Application Priority Data

Jun. 27, 1978 [DE] Fed. Rep. of Germany ....... 2828101

[51] Int. Cl.³ .............................................. F16D 65/12
[52] U.S. Cl. ........................... 188/218 XL; 192/70.13; 192/107 R
[58] Field of Search ....................... 188/218 XL, 73.2; 192/107 R, 70.13; 301/6 E

[56] References Cited

U.S. PATENT DOCUMENTS

| 900,282 | 3/1933 | Halbach | 188/218 XL |
|---|---|---|---|
| 3,198,295 | 8/1965 | Fangman et al. | 188/218 XL X |
| 3,295,641 | 1/1967 | Eaton et al. | 188/218 XL |
| 4,018,311 | 4/1977 | Tickle | 188/218 XL |

FOREIGN PATENT DOCUMENTS

| 205995 | 12/1957 | Austria | 188/218 XL |
|---|---|---|---|
| 2438318 | 2/1976 | Fed. Rep. of Germany | 188/218 XL |
| 2727565 | 1/1978 | Fed. Rep. of Germany | 192/107 R |
| 186827 | 12/1963 | Sweden | 188/218 XL |
| 1412758 | 11/1975 | United Kingdom | 188/218 XL |
| 297165 | 8/1969 | U.S.S.R. | 188/218 XL |

Primary Examiner—George E. A. Halvosa
Attorney, Agent, or Firm—Edmund M. Jaskiewicz

[57] ABSTRACT

A brake disk for a disk brake mounted on either the axle or wheel of a rail vehicle has on its inner peripheral portion a flange ring provided with parallel annular surfaces which are inclined to a central plane of the disk brake. These inclined surfaces are clamped between an inclined surface on a hub and an inclined surface on a retaining ring. The retainer ring is closely positioned upon the hub but in such a manner that any thermal expansion of the brake disk will enable the flange ring to move unhindered in an oblique radial outward direction while at the same time maintaining the brake disk locked and centered without overstressing the fastening bolts which pass through the hub portion and the retainer ring.

16 Claims, 6 Drawing Figures

BRAKE DISK FOR DISK BRAKES ON A RAIL VEHICLE

The present invention relates to a brake disk for a disk brake mechanism mounted on either the axle or wheel of a rail vehicle, more particularly, to the mounting of the brake disk on a hub in a secure and accurate manner while avoiding any adverse effects from thermal expansion of the brake disk.

Disk brakes on railway and other vehicles are generally provided with a brake disk which is mounted either on the vehicle wheel on or an axle by means of a hub. The brake disk is generally provided with two opposed lateral surfaces which can be pressed from both sides by brake shoes. The brake disk is in the form of an annular braking element which is essentially formed of two brake disks each having a friction surface and provided on its inner portion with a flange ring which is constructed so as to function as a cam. This flange ring surrounds the cylindrical body of a hub mounted on the vehicle shaft so that the flange ring is positioned in an annular clearance formed on the circumference of the hub between an annular section of the hub which at least partially radially overlaps the flange ring and a retainer ring positioned upon the cylindrical portion of the hub and positioned axially from the flange ring. The retainer ring is clamped by suitable fastener means such as a bolt to the hub so as to clamp the flange ring between the retainer ring and hub.

It is the general practice to make the brake disk itself upon which is mounted the braking surface of a cast iron and to make the supporting body which is in the form of a hub of steel. Thus, the favorable frictional and heat-conductive characteristics of cast iron is coupled with high-strength and good stress characteristics of steel.

Problems have always been encountered in the connection between the friction brake disk and the hub since the mounting of the disk upon the hub required particularly and skilled attention. The high thermal stresses to which the brake disk was subjected together with dynamic stresses arising from shocks and impacts on the brake disk during operation of the rail vehicle imposed stresses upon the brake disk which subsequently resulted in damage or even destruction of the brake disk.

In order to overcome these stress problems it has been proposed to employ various forms of prestressed force locks in an attempt to provide a proper connection between the hub and the brake disk. Thermal expansion of the brake disk is generally taken up by resilient material interposed between the brake disk and the hub or by using connecting elements which permitted some sliding movement of the disk with respect to the hub resulting from thermal expansion.

The advantages of a sliding connection between the brake disk and the hub are largely counterbalanced by a high degree of wear between the sliding elements which results in an premature loosening of the mounting between the disk and hub, or by excessive wear between two components. Another disadvantage is that when the brake disk becomes heated through use the brake disk may be shifted from its precisely determined centered position since the expansion of the brake disk means the brake disk moves from its original determined position and may expand in an unpredictable direction when subjected to thermal stresses.

It is therefore the principal object of the present invention to provide a novel and improved connection between the brake disk and hub of a disk brake as described herein.

It is another object of the present invention to provide a connection between the brake disk and hub of a disk brake which withstands dynamic stresses and which yields to thermal expansion of the brake disk without any deterioration of the secure connection between the brake disk and hub while at the same time maintaining the centered position of the brake disk and experiencing only a small degree of wear.

It is an additional object of the present invention to provide such a connection between a brake disk and hub of a disk brake whose manufacture and assembly is relatively simple and requires no specialized equipment.

According to one aspect of the present invention a brake disk for a disk brake on a rail vehicle may comprise a hub on which is a first annular surface inclined at an angle to a radial plane of the hub. An annular braking element has a flange ring at its inner peripheral portion and this flange ring is provided with second and third axially spaced parallel annular surfaces each of which are inclined at the same angle to a radial plane of the hub. A retainer ring is positioned upon the hub and has a fourth annular surface also inclined at the same angle, and this fourth annular surface engages the second annular surface of the flange ring. A fastener which may be a bolt interconnects the retainer ring and a portion of the hub so as to clamp the flange ring therebetween in such a manner that the first and third annular surfaces are in contact with each other and the second and fourth annular surfaces are in contact with each other.

The annular braking element may comprise a pair of axially spaced annular braking members which may be mounted on a hub which in turn is mounted upon an axle or which may be mounted on opposite sides of the flange of a wheel for a rail vehicle.

The flange ring is clamped between inclined surfaces so as to be limited in movement in an axial direction but is free to move radially outwardly because of thermal expansion along the abutting surfaces inclined at an angle to the center radial plane of the brake disk. The flange ring positioned in this annular gap between the inclined surfaces can thus move obliquely in an outward radial direction without disturbing in any way the strength of the connection between the disk and the hub, the centering of the disk and the hub and without overstressing the fastening bolts securing the flange ring between the retainer ring and a portion of the hub.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
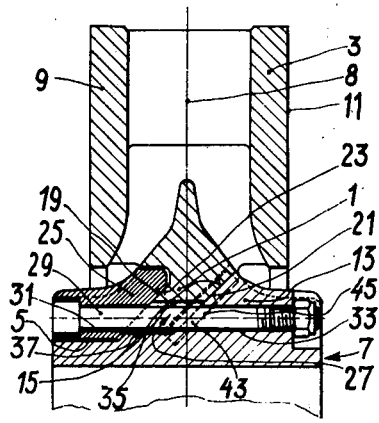
FIG. 1 is a radial sectional view of half of a brake disk showing the mounting of the brake disk upon the hub according to the present invention.
Figure 2:
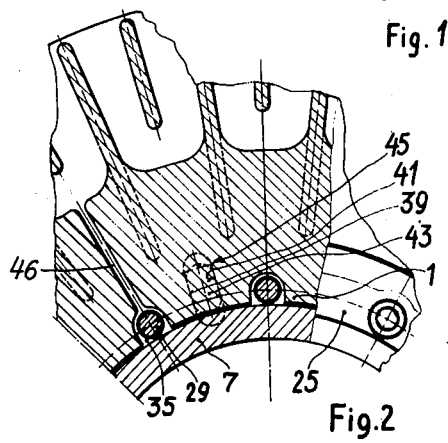
FIG. 2 is a sectional view in an axial direction of the portion of the brake disk shown in FIG. 1.

As may be seen in FIGS. 1 and 2, a flange ring 1 is connected at the inner peripheral portion of an annular braking member 3 which is provided with laterally opposed friction surfaces 9 and 11. The flange ring 1 is positioned centrally of the friction surfaces 9 and 11 and along the central radial plane 8 of the annular braking member. The inner portion of the flange ring 1 is provided with a cylindrical surface 37 which is positioned upon a cylindrical body portion 5 of a support body or hub 7. The hub 7 has an annular section 13 in substantially the shape of a rib upon which is formed an annular seating surface 15 inclined at an angle of approximately 45° with respect to the central radial plane of the annular braking member.

The flange ring 1 is formed with a conical annular surface 21 which is seated upon the annular surface 15 on the hub. On the side of the flange ring 1 away from the annular surface 21 there is formed a similar conical annular surface 19 which is inclined at the same angle as annular surface 21 so that the surfaces 19 and 21 are parallel to each other. A retainer ring 25 is positioned upon the cylindrical portion 5 of the hub and is provided with an inclined annular gripping surface 23 which is conical in shape and complementary to the annular surface 19 on the flange ring so as to be seated upon this annular surface. The annular seating surface 15 upon the hub 7 and the annular gripping surface 23 on the retainer ring 25 form therebetween an annular gap or space 27 having inclined or conical shaped surfaces between which is positioned the flange ring 1 of the annular braking element 3.

The inner peripheral surface 37 of the flange ring 1 is also positioned upon a cylindrical portion on the hub 7 with a radial clearance. Within this peripheral surface 37 there is formed a plurality of axially extending radial recesses 35. The retainer ring 25 is clamped to the hub 7 by means of a bolt 29 passing through a bore 31 in the retainer ring, a recess 35 in the flange ring 1 and a bore 33 in the hub 7. Preferably, the bolt 29 passes through the bores 31 and 33 with clearance. The middle portion of the bolt 29 passes through the recess 35 of the flange ring 1 which is positioned so that its inner peripheral surface 37 is at a slight radial clearance outwardly from a cylindrical portion 5 of the hub and the surfaces of the recess 35 enclose or surround the bolt 29.

A torsional safety device which provides a positive torque transmitting connection is shown in FIGS. 1 and 2 and comprises a plate 43 which is seated in opposed recesses 45 running longitudinally in the axial direction and formed in the seated annular surfaces 15 and 21 so as to here have clearance in the circumferential direction. The recess 45 formed in the annular surface 21 of the flange ring is open on both ends thereof radially inwardly and radially outwardly of the flange ring. The recess in the surface 15 in the annular section 13 of the hub extends radially inwardly of the bore hole 33 as can also be seen in FIG. 1. The plate 43 is flat and is formed with two parallel longitudinal surfaces 39 and 41 which engage the surfaces of the recesses in the circumferential direction and the ends of the plate 43 are preferably curved, as also shown in FIG. 2.

The flange ring 1 is provided with a plurality of slots 46 each of which extend radially outwardly from a recess 35, as may be seen in FIG. 2. Not all recesses 35 may have a slot 46.

Figure 4:
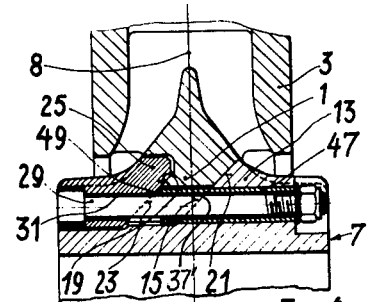
FIG. 4 is a view similar to that of FIG. 1 and showing a further modification of the connection between the brake disk and the hub.
Figure 3:
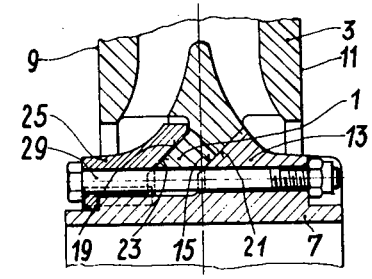
FIG. 3 is a view similar to that of FIG. 1 and showing a modification of the connection between the brake disk and hub.

In the modification of FIGS. 3 and 4, the flange ring 1 has an inwardly directed peripheral surface 37' which is located radially outwardly of the bolt 29 and does not extend to the cylindrical portion 5 of the hub 7, as in the embodiment of FIGS. 1 and 2. The conical annular surfaces 19 and 21 in the modification of FIGS. 3 and 4 are thus somewhat narrower but extend into the annular gap or clearance 27 in the same manner as previously described.

In the modification of FIG. 4 there is provided a further modification of a torque safety device which comprises a sleeve 47 surrounding the bolt 29 and firmly seated within the bore 33 of the hub. The sleeve 47 has a portion extending outwardly of the annular seating surface 15 in the direction of the middle plane 8. This extended portion of the sleeve 47 projects into radial recess 49 formed by the inner peripheral surface of the flange ring 1 with an inner radial clearance. The extended portion of the sleeve 47, however, terminates short of the annular surface 23 on the retainer ring 25.

The bolt 29 passes through the sleeve 47 so as to clamp the flange ring 1 between the retainer ring 25 and the annular section 13 of the hub to lock the flange ring in position with force in a manner similar to that of the embodiment of FIGS. 1 and 2. The annular surface 23 of the retainer ring 25 is thus seated firmly upon the corresponding or complementary surface 19 on the flange ring 1.

While preferable, it is not necessary that a sleeve 47 be positioned on each of the fastener bolts 29.

Figure 5:
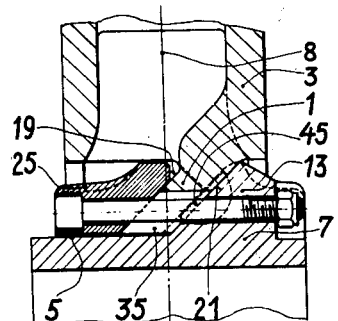
FIG. 5 is a view similar to that of FIG. 1 and showing still another modification.

In FIG. 5, the flange ring 1 is shown as extending from the friction disk 11 of the annular braking element 3 such that the flange ring is located at the inner peripheral portion of one of the friction disks. The inner peripheral surface of the flange ring 1 is formed with a plurality of radial recesses 35 to accommodate the bolt 29 in the same manner as described in connection with FIGS. 1 and 2. In all other respects, the modification of FIG. 5 is assembled and functions in the same manner as the embodiment of FIGS. 1 and 2.

Figure 6:
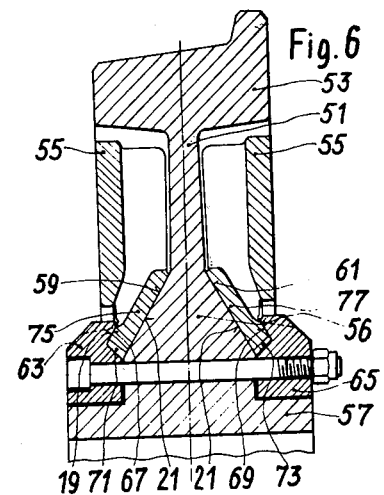
FIG. 6 is a view similar to that of FIG. 1 but showing the invention as applied to a disk brake mounted on a wheel of a rail vehicle.

In FIG. 6, the present invention is shown as applied to a flanged wheel of a rail vehicle. In this modification friction disks 55 are positioned on both sides of a flange 51 of a wheel from a rail vehicle. The wheel comprises a hub 57 and radially outwardly of the hub is a hub transition portion 56 having surfaces 59 and 61 which taper inwardly and radially outwardly to interconnect with the flange 51. Radially outwardly of the flange 51 is a rim 53 which is shaped in the conventional manner for use on rail vehicles. The surfaces of the friction disk 55 away from the friction surfaces are provided with a plurality of radially extending cooling ribs and on the radially inner portions of the cooling ribs are formed flange rings 75 and 77 for the friction disks. The flange rings 75 and 77 are spaced from the inner peripheral surfaces of the disks 55 so as to form an inlet for air circulating behind the friction disks and radially outwardly of the cooling ribs. The outer peripheral edges of the friction disks 55 terminate short of the rim so as to provide exits for the circulating cooling air. The cooling ribs are so constructed that they do not contact the wheel flange 51 but are spaced therefrom, as can be seen in FIG. 6.

Annular seating surfaces 59 and 61 are formed on the opposite sides of the hub transition portion 56. The annular surfaces 59 and 61 each define a conical surface having an inclination of approximately 30° with respect to the central radial plane of the vehicle wheel. If the annular surfaces 59 and 61 are extended radially outwardly they will intersect radially outwardly of the transition portion 56.

The flange rings 75 and 77 are formed with annular seating surfaces 21 which seat upon the annular surfaces 59 and 61, as shown in FIG. 6.

On both sides of the transition portion 56 are retainer rings 63 and 65 having respectively annular gripping surfaces 67 and 69 which are directed toward the central radial plane of the wheel. On each of the retainer rings 63 and 65 immediately below the surfaces 67 and 69, as seen in FIG. 6, annular clearances or spaces 71 and 73 are provided and within these spaces are seated the flange rings 75 and 77 when the retainer rings are assembled as shown in FIG. 6. Bolts 29 pass through the retainer rings 63 and 65 and through the hub transition portion 56 to assemble the brake disk as shown in FIG. 6. The retainer rings 63 and 65 are preferably positioned with some radial clearance between the retainer rings and the hub 57.

The radially inwardly disposed annular surface area and the peripheral surfaces of the retainer rings 63 and 65 actually directed to the hub transition portion 56 are provided with clearance with respect to their opposing or corresponding surfaces or areas so that the gripping surfaces 67 and 69 on the retainer rings can be positioned uniformly and precisely on the flange rings, which in turn are uniformly and precisely positioned upon the annular surfaces 59 and 61 of the hub transition portion.

When the brake disk of FIG. 6 is on operation or service the friction disks will become heated and the brake disk will be subjected to thermal expansion. As the annular braking element 3 or 55 is heated this member will move radially outwardly and the respective flange rings 1 or 75,77 will also move correspondingly. The retention of the flange rings under stress in the annular clearance 27 or the clearances 71,73 will provide no resistance against the radially outward movement of the flange rings. Since the retainer rings 25 and 63,65 and the hub annular section 13 and the hub transition area 57 of the hub will incur virtually no heating-up, the magnitude of the annular clearances 27 and 71,73 remains virtually unchanged.

The initial prestressing force to which the bolts 29 were subjected upon the assembly of the brake disk at ambient temperature or in the cold state, also remains unchanged. Accordingly, the friction sliding of the conical annular surfaces 19,21 and 59,61 occurs with a virtually unchanged magnitude in the locking force with respect to the annular seating surfaces 15 and 49,51 and the gripping surfaces 23 and 67,69.

It is therefore apparent that the centering or precise positioning of the annular braking element 3 and 55 is assured with respect to the hub 7 or wheel hub 57 in both the cold or ambient state as well as in the heated state of the brake disk. The relatively large surface support of the conical annular surfaces 21 and 59,61 on the completely encircling annular seating surface 15 and 59,61 does not permit any eccentric positioning of the friction disks with respect to their respective supporting bodies.

Apart from the inital prestress force to which the through bolts 29 are subjected, these bolts do not incur any unusual or unpermissible high loads as result of heating of the brake disks.

It is therefore apparent that the present invention has disclosed a relatively simple but effective mounting of a brake disk upon its hub for mounting on an axle or upon a flanged wheel of a railway vehicle.

It will be understood that this invention is susceptible to modification in order to adapt to different usages and conditions, and accordingly, it is desired to comprehend such modifications within this invention as may fall within the scope of the appended claims.

What is claimed is:

1. A brake disk for a disk brake on a rail vehicle comprising a hub having a first conical annular surface inclined at an angle of substantially 45° to a radial plane of said hub, a retainer ring positioned upon said hub and having a fourth conical annular surface inclined at said angle and said fourth conical annular surface spaced from said first conical annular surface, and annular braking element having at its inner peripheral portion a flange ring having second and third axially spaced parallel conical annular surfaces each inclined at said angle, and fastener means interconnecting said retainer ring and a portion of said hub to clamp said flange ring therebetween such that said first and third conical annular surfaces engage each other and said second and fourth conical annular surfaces engage each other but said flange ring is free of engagement with said hub, said flange ring being clamped against axial movement but capable of radially outward movement along the engaging conical surfaces because of any thermal expansion of the annular braking element while maintaining the centering of the annular braking element with respect to the hub.

2. A brake disk as claimed in claim 1 wherein said annular braking element comprises a pair of axially spaced annular braking members and said flange ring is disposed at one of said annular braking members.

3. A brake disk as claimed in claim 1 wherein said first and third annular surfaces have opposed recesses therein, and means seated within said opposed recesses for transmitting torque between said hub and said annular braking element.

4. A brake disk as claimed in claim 3 wherein the recess in the third annular surface of said flange ring opens at both radially inwardly and radially outwardly ends thereof.

5. A brake disk as claimed in claim 1 wherein said annular braking element comprises a hub portion and a pair of axially spaced braking disks defining a single component assembled upon said annular braking element hub portion.

6. A brake disk as claimed in claim 1 and further comprising a torque safety device between said hub and said retainer ring.

7. A brake disk as claimed in claim 1 wherein said hub has a cylindrical body portion and said flange ring has a cylindrical surface positionable on said cylindrical body portion.

8. A brake disk as claimed in claim 7 wherein the cylindrical surface of said flange ring has at least one radially extending recess adapted to accommodate said fastener means therein.

9. A brake disk as claimed in claim 8 wherein said flange ring has a plurality of slots each extending radially from one of said recesses.

10. A brake disk as claimed in claim 8 wherein said hub has an annular rib section upon which is positioned said first annular surface, there being an axial bore through said annular rib section and receiving said fastener means therein, and a sleeve within said bore surrounding said fastener means and extending into said radial recess of said flange ring with an inner radial clearance, said sleeve terminating short of said fourth annular surface on said retainer ring.

11. A brake disk as claimed in claim 7 wherein the cylindrical surface of said flange ring is spaced radially outwardly of said fastener means.

12. A brake disk for a disk brake on a rail vehicle comprising a hub having a first conical annular surface inclined at an angle of substantially 30° to a radial plane of said hub, a retainer ring positioned upon said hub and having a fourth conical annular surface inclined at said angle and said fourth conical annular surface spaced from said first conical annular surface, an annular braking element having at its inner peripheral portion a flange ring having second and third axially spaced parallel conical annular surfaces each inclined at said angle, and a fastener means interconnecting said retainer ring and a portion of said hub to clamp said flange ring therebetween such that said first and third conical annular surfaces engage each other and said second and fourth conical annular surfaces engage each other but said flange ring is free of engagement with said hub, said flange ring being clamped against axial movement but capable of radially outward movement along the engaging conical surfaces because of any thermal expansion of the annular braking element while maintaining the centering of the annular braking element with respect to the hub, said hub comprises a hub of a rail vehicle wheel having a transition portion and a flange extending radially from said transition portion, said annular braking element positioned on one side of said flange and a second annular braking element positioned on a second side of said flange, said first conical annular surface being on one side of said hub transition portion and a fifth conical annular surface being on a second side of said transition portion and inclined at an angle of substantially 30° to a radial plane of the hub, a second retainer ring having a sixth conical annular surface inclined at said angle and the fourth and sixth conical annular surfaces of said first and second retainer rings being respectively directed toward said hub transition portion, said fastener means passing through said retainer rings and said hub transition portion to clamp said flange rings upon said first and fifth conical annular surfaces of said hub transition portion and said fourth and sixth conical annular surfaces of said retainer rings respectively such that there are annular clearances between portions of said respective ones of said flange rings and said retainer rings.

13. A brake disk as claimed in claim 12 wherein said flange rings are disposed radially inwardly of radial cooling ribs on the sides of said first and second annular braking elements away from friction surfaces thereon, the third and sixth conical annular surfaces on said flange rings inclined oppositely with respect to each other at said angle of about 30° to a central radial plane of the wheel, the portions of said first and and fifth conical annular surfaces of said hub transition portions closest to the hub being spaced from said retainer rings.

14. A brake disk as claimed in claim 13 wherein said flange rings respectively are spaced from the ribs on said annular braking elements to define inlet openings to said ribs, the radially outer edge of said annular braking elements being spaced radially inwardly of a rim on said rail vehicle wheel to define annular outlets for air passing over said cooling ribs.

15. A brake disk as claimed in claim 13 wherein said radial cooling ribs on said annular braking element are spaced from the flange of the wheel.

16. A brake disk as claimed in claim 12 wherein said first and fifth conical annular surfaces on said hub transition portion each are inclined inwardly toward the wheel flange in a radially outward direction.

* * * * *